United States Patent
Sharma et al.

(10) Patent No.: US 10,102,383 B2
(45) Date of Patent: Oct. 16, 2018

(54) PERMANENTLY ERASING MECHANISM FOR ENCRYPTION INFORMATION

(75) Inventors: Vikram Sharma, Acton (AU); John Leiseboer, Acton (AU)

(73) Assignee: QUINTESSENCELABS PTY LTD., Deakin (AU)

( * ) Notice: Subject to any disclaimer, the term of this patent is extended or adjusted under 35 U.S.C. 154(b) by 0 days.

(21) Appl. No.: 14/239,652

(22) PCT Filed: Aug. 16, 2012

(86) PCT No.: PCT/AU2012/000966
§ 371 (c)(1),
(2), (4) Date: May 28, 2014

(87) PCT Pub. No.: WO2013/026086
PCT Pub. Date: Feb. 28, 2013

(65) Prior Publication Data
US 2014/0337640 A1 Nov. 13, 2014

Related U.S. Application Data

(60) Provisional application No. 61/525,624, filed on Aug. 19, 2011.

(51) Int. Cl.
*G06F 21/60* (2013.01)
*G06F 3/06* (2006.01)
(Continued)

(52) U.S. Cl.
CPC .......... *G06F 21/602* (2013.01); *G06F 3/0623* (2013.01); *G06F 3/0664* (2013.01);
(Continued)

(58) Field of Classification Search
CPC ............ H04L 9/00; H04L 9/32–9/3297; H04L 63/04–63/0492; H04L 63/08–63/0892;
(Continued)

(56) References Cited

U.S. PATENT DOCUMENTS

2005/0152540 A1* 7/2005 Barbosa ................ H04L 9/0858
380/28
2005/0232415 A1 10/2005 Little et al.
(Continued)

FOREIGN PATENT DOCUMENTS

WO WO2007109373 A2 11/2007

OTHER PUBLICATIONS

European Search Report and Opinion for European patent application EP12826082 (dated Dec. 18, 2014) 6 pages.
(Continued)

*Primary Examiner* — Ashokkumar B Patel
*Assistant Examiner* — Quazi Farooqui
(74) *Attorney, Agent, or Firm* — Kilpatrick Townsend & Stockton LLP

(57) ABSTRACT

A system for protecting data includes a virtual zeroisation device which receives data to be encrypted and key material for encrypting the data. The key material is stored in a storage device. As the encryption unit encrypts the data using the key material, the encrypted data is stored in the storage device and overwrites the key material.

17 Claims, 5 Drawing Sheets

(51) Int. Cl.
*H04L 9/06* (2006.01)
*G06F 21/79* (2013.01)
*H04L 9/08* (2006.01)
*H04L 9/12* (2006.01)

(52) U.S. Cl.
CPC ............ *G06F 3/0673* (2013.01); *G06F 21/79* (2013.01); *H04L 9/0656* (2013.01); *H04L 9/0852* (2013.01); *H04L 9/0894* (2013.01); *H04L 9/12* (2013.01); *G06F 2221/2143* (2013.01)

(58) Field of Classification Search
CPC ....... H04L 9/0894; H04L 9/12; H04L 9/0852; H04L 9/0656; G06F 15/16; G06F 21/30–21/46; G06F 21/60–21/645; G06F 9/00; G06F 3/0623; G06F 3/0673; G06F 3/0664; G06F 2221/2143
USPC ......... 713/189–194; 726/1, 6, 18, 19, 23, 30
See application file for complete search history.

(56) References Cited

U.S. PATENT DOCUMENTS

| | | | |
|---|---|---|---|
| 2006/0177065 A1* | 8/2006 | Halbert | H04L 9/0662 380/277 |
| 2008/0263363 A1* | 10/2008 | Jueneman | G06F 21/32 713/184 |
| 2009/0196417 A1 | 8/2009 | Beaver et al. | |
| 2010/0169669 A1* | 7/2010 | Smith | G06F 21/6218 713/193 |
| 2010/0246811 A1* | 9/2010 | Sadler | H04L 9/3226 380/28 |
| 2011/0307724 A1 | 12/2011 | Shaw et al. | |
| 2012/0269346 A1* | 10/2012 | Best | H04L 63/0457 380/270 |

OTHER PUBLICATIONS

International Search Report for PCT patent application PCT/AU2012/000966 (dated Aug. 30, 2012).

* cited by examiner

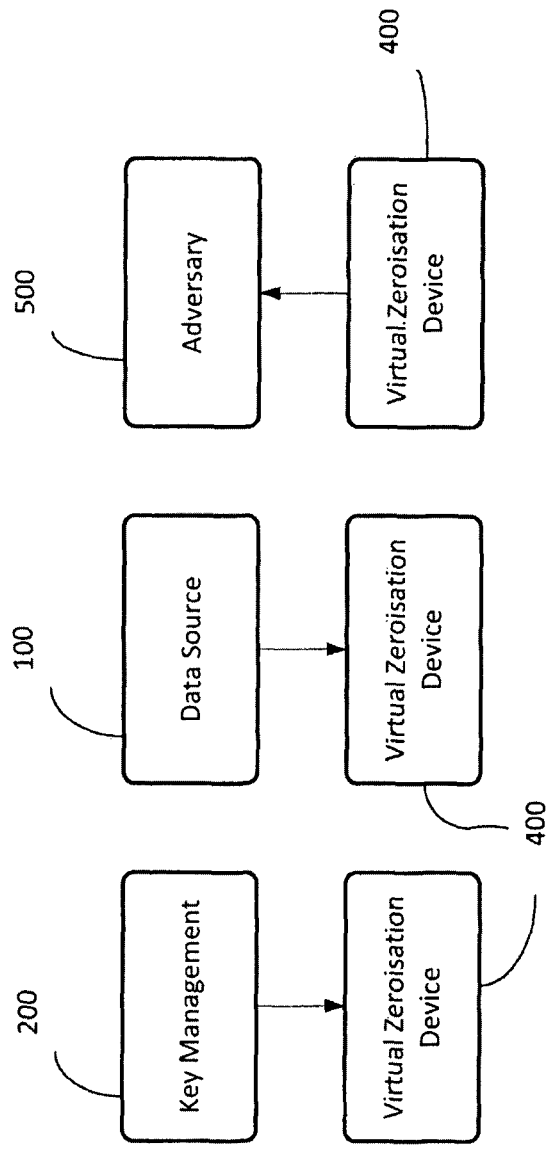

PERMANENTLY ERASING MECHANISM FOR ENCRYPTION INFORMATION

CROSS-REFERENCE TO RELATED APPLICATIONS

This patent application claims priority from U.S. Provisional Application Ser. No. 61/525,624, filed Aug. 19, 2012, entitled "Virtual Zeroisation," the contents of which are incorporated by reference herein.

BACKGROUND OF THE INVENTION

This invention is in the field of information security, and more particularly relates to data encryption, data access control, encryption key storage, encryption key management, secure data storage, and data zeroisation.

Zeroisation is the cryptographic operation of erasing from the memory of a device sensitive material such as electronically stored data, cryptographic keys, or other information to prevent disclosure of that information to a later user of the device. Zeroisation is generally accomplished by deleting or writing over the contents to prevent recovery of the original data. For example, the memory can be overwritten with a meaningless value such as all zeros. In tamper resistant hardware, automatic zeroisation may be initiated if tampering is detected. Such circumstances can place unusual demands on the hardware designer, e.g. the need for the device to perform zeroisation even in the absence of connection of the device to a power supply.

Also related to zeroisation are prior art techniques for protection of data. These include storage devices which use ciphers with fixed length keys to encrypt stored data. Such storage devices can be loaded with keys, either persistently, or dynamically. The keys themselves are reused for encryption and decryption operations on the device. Unfortunately, in the event of loss, theft, or compromise of the device, it is sometimes possible for an unauthorized party to recover the key.

Devices used in high security environments often employ some form of manually initiated zeroisation functionality, usually initiated by pressing a button, which erase the key material from the device when circumstances require it. Unfortunately this leaves the device vulnerable to human error, and may allow the stored confidential data to be accessed by an adversary.

SUMMARY OF THE INVENTION

We have developed a device and method of operation which protects confidential data on mobile data collection devices, even if those devices fall into an adversary's possession, and even if the devices have not been zeroised when they come into the possession of an adversary. Thus our technique avoids the need for manually initiated zeroisation, as well as any need for zeroisation in the event of a power failure.

We refer to the technique described here as virtual zeroisation. As data is collected by a mobile asset, our system virtually zeroises that information as it is written to a data storage device using an information-theoretically secure cipher. The system uses one-time key material with the cipher, and erases the key material as it used, obviating the need for anti-tampering devices, as well as any form of manual or automatic initiated zeroisation functionality.

In a preferred embodiment a system for protecting data includes a data source which provides data to be encrypted, a key management system which provides key material, and a virtual zeroisation device which receives the data and the key material. The virtual zeroisation device includes an encryption unit for encrypting the data using the key material and a storage device for storing the key material and the encrypted data. In operation the key material is first stored in the storage device. The encryption unit then encrypts the data using selected key material from the storage device. Once the data is encrypted, it is stored in the storage device to overwrite all of the selected key material. Preferably the key material is a one-time pad, for example, as generated by a quantum random number generator.

In another preferred embodiment, a virtual zeroisation device includes an encryption unit adapted to be coupled to an external unit for receiving data to be encrypted and to receive key material for encrypting the data to provide encrypted data. The key material, preferably a one-time pad, is stored in a storage device coupled to the encryption unit. In operation the encryption unit encrypts the data using selected key material from the storage device, and then stores the encrypted data in the storage device to overwrite all of the selected key material.

A method of securely protecting data according to another embodiment of the invention includes the steps of storing one-time pad key material in a storage device, using the one-time pad key material to encrypt data to be protected, and then writing the encrypted data into the storage device in place of all of the one-time pad key material used to encrypt the data.

BRIEF DESCRIPTION OF THE DRAWINGS

FIG. 5 illustrates an example of how the virtual zeroisation device protects its stored data even if the device is in possession of an adversary.

DETAILED DESCRIPTION OF THE PREFERRED EMBODIMENTS

Figure 1:
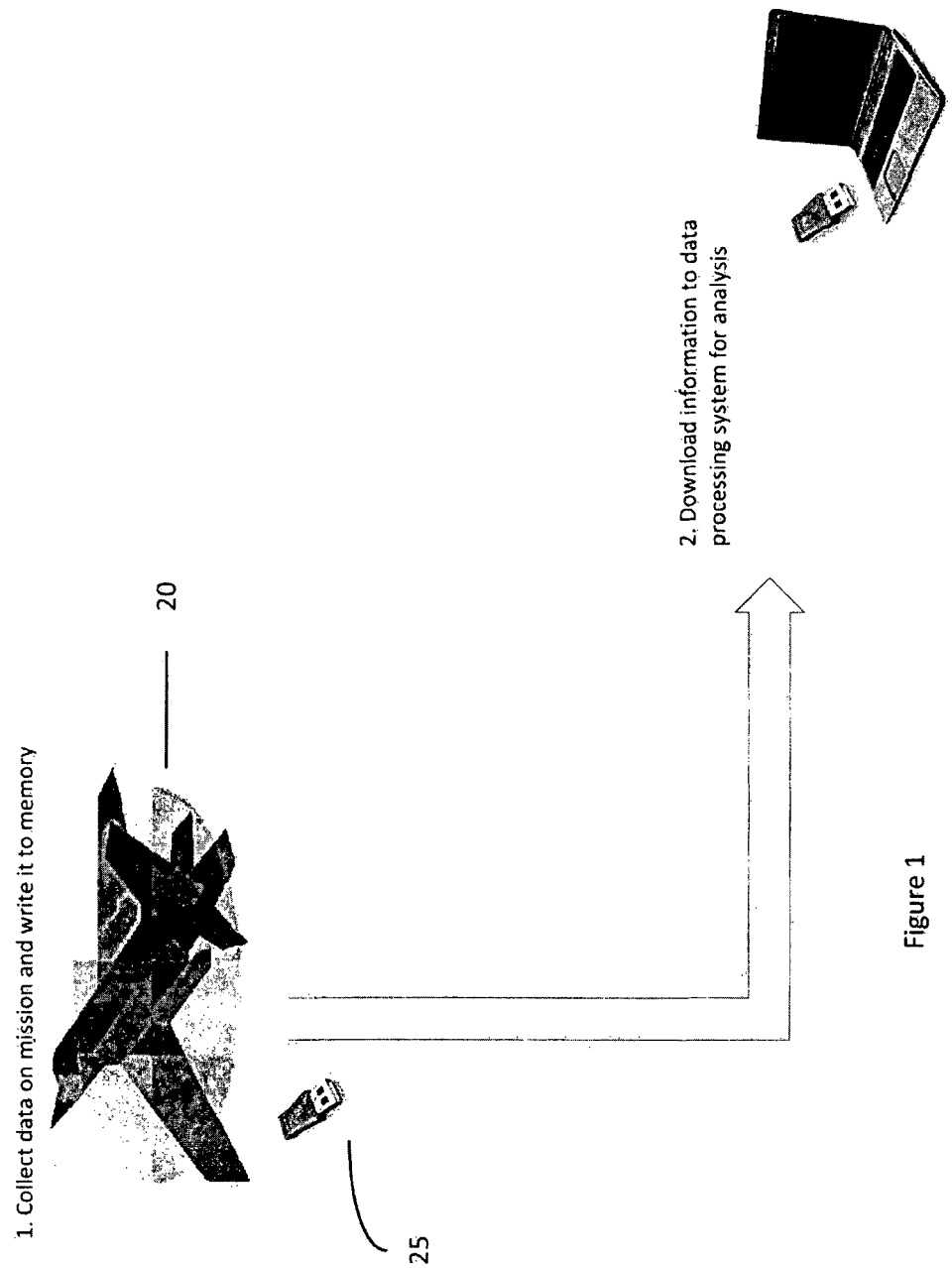
FIG. 1 illustrates a typical circumstance in which protection of data during operations is required.

FIG. 1 illustrates a typical data collection circumstance in which security of the data is important, and in which the data is vulnerable to compromise. As shown, an aircraft 20 flying a military mission collects data in a storage device 25, e.g. a solid state memory, a hard disk, or other device. This data may consist of video information, military target information, or similar information which is desired to remain secure. As the aircraft flies its mission, the data is collected and stored in device 25.

As the aircraft flies it may transmit the data back to a base station, or the encrypted data may be stored on the aircraft as it performs its mission. If the data is stored on the aircraft, once the aircraft lands, the device can be removed from the aircraft and provided for analysis by an appropriate individual. As illustrated by the diagram, there are numerous opportunities for the data to be compromised. In particular, if the device 25 comes into possession of an adversary the data will not necessarily be protected, even if stored in encrypted form on the device 25.

Figure 2:
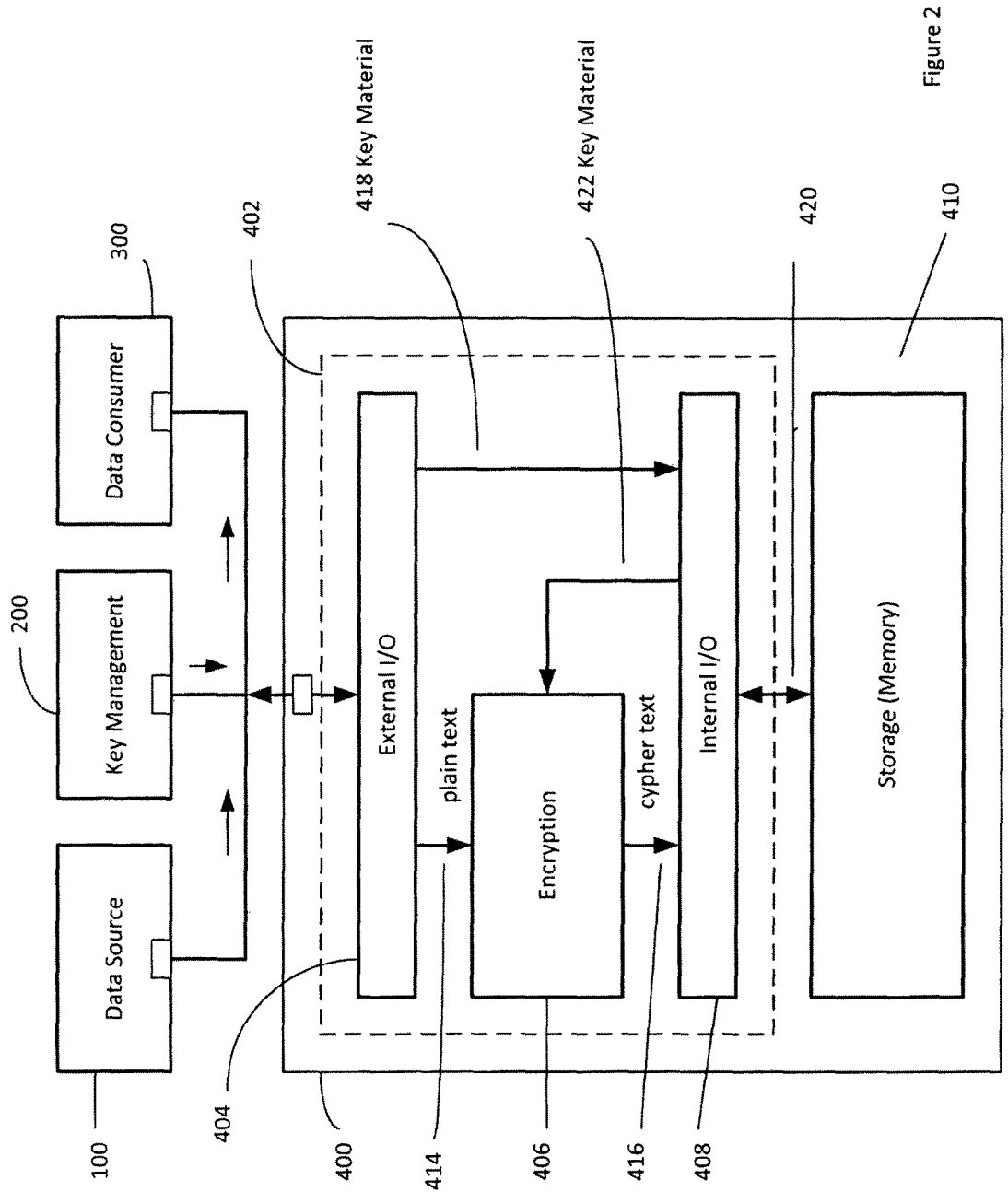
FIG. 2 is a block diagram of a preferred implementation of a virtual zeroisation device.

FIG. 2 illustrates a preferred implementation of our virtual zeroisation device, and the system within which it operates. As illustrated in the figure, the system includes a data source 100, a key management system 200, and a data consumer 300. With regard to the application described in FIG. 1, the data source 100 consists of a sensor, camera, or other data collecting device mounted on the airplane, and if the data is being stored as it is collected, the storage device itself can become the data source. The data consumer can read the encrypted data from the storage device, or receive the encrypted data using any one of a number of mechanisms, including network communications, file transfer from an intermediate device, etc. The data storage device may be, but does not have to be, physically connected to the data consumer. The data consumer obtains key material from the key manager which it uses to decrypt, and then process, the data saved on the storage device.

The virtual zeroisation device 400 is selectively connected to each of the data source 100, data consumer 300, and a key management system 200. The virtual zeroisation device 400 is not usually connected to all of these other components at the same time. Typically the connections made are preferably sequential. Usually the virtual zeroisation device 400 is connected to key management system 200 enabling key material to be stored on device 400. The device 400 can then be connected to data source to collect the data and save the data as encrypted data on the virtual zeroisation device 400. Once all of the desired data is encrypted and stored, the virtual zeroisation device 400 is optionally connected to the data consumer 300 enabling the data to be decrypted and analysed. Alternatively the encrypted data may be read from the virtual zeroisation device 400 and transferred to the data consumer where the data is decrypted and analysed. In either approach, the data consumer 300 is connected to the key management system 200 to get the key material, for decryption. As mentioned above, the connections among the various devices need not be direct physical connections; the connections may be made using any desired transmission medium.

Each of the data source 100, data consumer 300, key management system 200, and virtual zeroisation device 400 communicates with each other through well-known appropriate well known interfaces and buffers. These are illustrated in the drawing as small rectangles where the connectors to each block are depicted.

The key management system 200 provides encryption key material to both the data consumer 300 and the virtual zeroisation storage device 400—although not necessarily at the same time. While this key material can be provided in different formats, e.g. as a one-time pad, or as a fixed length symmetric, or asymmetric wrapping key, in the preferred embodiment, we use "one-time pad" key material.

A one-time pad is a type of encryption which is impossible to defeat if used correctly. One-time pads are said to be "information-theoretically secure" in that the encrypted message, that is the cipher text, provides no information about the original message to a cryptanalyst. Properly created and used one-time pads are secure even against adversaries with infinite computational power.

In a one-time pad each bit or character from the plain text is encrypted by a modular addition e.g. an exclusive OR, with a bit or character from the secret random key (one-time pad) of the same length as the plaintext, thereby providing cipher text. Claude Shannon proved, using information theory considerations, that the one-time pad has a property of "perfect secrecy," that is, the cipher text gives absolutely no additional information about the plain text.

The key management system 200 can be any type of device which provides encryption keys for use in encrypting data from the data source as will be described further below. In a preferred embodiment, however, the key management system provides keys in the form of a one-time pad which are used to encrypt and decrypt the data from the data source 100. This one-time pad key information can be provided using various techniques, however, in the preferred embodiment we employ quantum technology to generate truly random key material. One suitable approach for accomplishing this is to use the techniques described in our co-pending, commonly assigned patent application serial number PCT/AU2012/000390, filed Apr. 16, 2012, and entitled "QKD Key Management System." The contents of this application are incorporated by reference herein, as well as being included as an appendix.

In FIG. 2, the virtual zeroisation storage device 400 can be understood as including a virtual zeroisation control function 402 and a storage device 410. The storage device 410 can consist of any type of memory or storage device, e.g. a hard disk drive, a flash memory, etc. The virtual zeroisation control function 402 includes an external input/output interface 404, an encryption unit 406, an internal input/output interface 408, and various communication channels among these units and interfaces.

The virtual zeroisation device 400 is initially configured by being loaded with the one-time pad key from the key management system 200. The key management system 200 has a key management system interface (illustrated as a small rectangle) through which the encryption key material, i.e. one-time pad, is transmitted to both the virtual zeroisation device 400 through the virtual zeroisation storage device interface and to the data consumer 300 via the data consumer interface. The external input/output function 404 passes one-time pad key material from the key management system 200 to the internal input/output function 408 via the bypass channel 418. In the virtual zeroisation device 400, the one-time pad key is stored in the storage device 410.

When the virtual zeroisation device is placed in operation, the data source 100 (e.g. a camera on the aircraft 20) transmits its "plain text" data through the data source interface to the virtual zeroisation storage device 400 via the virtual zeroisation storage device interface. The virtual zeroisation storage device 400 receives the plain text data from the data source 100, passes it over plain text channel 414 to encryption unit 406. The internal input/output interface 408 passes one-time pad key material read from the storage device 410 via the storage channel 420 and the key input channel 422 to the encryption unit 406. Using the one-time pad key material, the encryption unit encrypts the plain text data and stores it in storage device 410 as cipher text. As the cipher text is stored in the storage device 410 it writes over the one-time pad key, thereby erasing it from the storage device 410. Thus the virtual zeroisation 402 operation causes key material read from the storage device 410 to be permanently erased from the storage device 410, thereby assuring that the key material can only be read once from the storage device 410, and is not recoverable from the virtual zeroisation storage device 400 after being read.

In addition to its enhanced security, among the particular advantages of the use of a one-time pad key in implementing the preferred embodiment of this invention is that the one-time pad key is not a persistent key. Unlike a persistent key, for example, a public key of a private-public key pair, it is unnecessary to preserve the one-time pad key for use in subsequent encryption operations. As the encryption process proceeds, the one-time pad key material is consumed, and need not be preserved. Writing the encrypted data back into the storage device over the one-time pad key enhances the security of the overall system by destroying the one-time pad key material essentially contemporaneously with its use for encryption.

Upon return from the mission, receipt of the data via transmission, or otherwise recovery of the virtual zeroisation device 400, data from the virtual zeroisation device 400 is provided to the data consumer. The internal input/output function 408 passes cipher text read from the storage device 410 via the storage channel 420 to the external input/output 404 via the bypass channel 418. From there it is provided to the data consumer 300 where it is decrypted using the one-time pad key material previously provided to the data consumer 300. Note that the one-time pad key material does not need to be provided to the data consumer at the same time as it is provided to the storage device. The key management system can store the key material until the data consumer is ready to use it.

Among the advantages of the invention are that, in the preferred implementation, data saved on the storage device is encrypted using an information theoretic cipher—the one-time pad—and that the key material used for the encryption cannot be recovered from the device. Further, because used key material is not recoverable, and because all stored data is information-theoretically securely encrypted, manually initiated zeroisation is not required. In addition, any unused key material remaining in the virtual zeroisation device 400 after use is of no value to an adversary—that key material never having been used. Thus, even if access to the device has been, or will be, compromised, anti-tamper functionality is not required.

The invention also overcomes other disadvantages of prior art approaches. In many applications, practical problems prevent the use of one-time pads. To be maximally effective, the one-time pad requires perfect randomness. While the system described here can be implemented with key material having less than perfect randomness, the quantum key management system described in our co-pending patent application referenced above generates completely random keys.

A second issue regarding one-time pads is the need to use, and therefore, distribute the same key material to the encryption system (here the virtual zeroisation device) and to the decryption system (here the data consumer). This requires secure communication of the key material between the two systems, an aspect that our co-pending patent application referenced above, provides. In addition the system here provides assurance that almost instantaneously with its use, the key material stored in the encryption system does not become available to the adversary. Our system denies an adversary access to the key material on the virtual zeroisation device by erasing the one time-pad from the virtual zeroisation device 400 as the key material is used.

Figure 3:
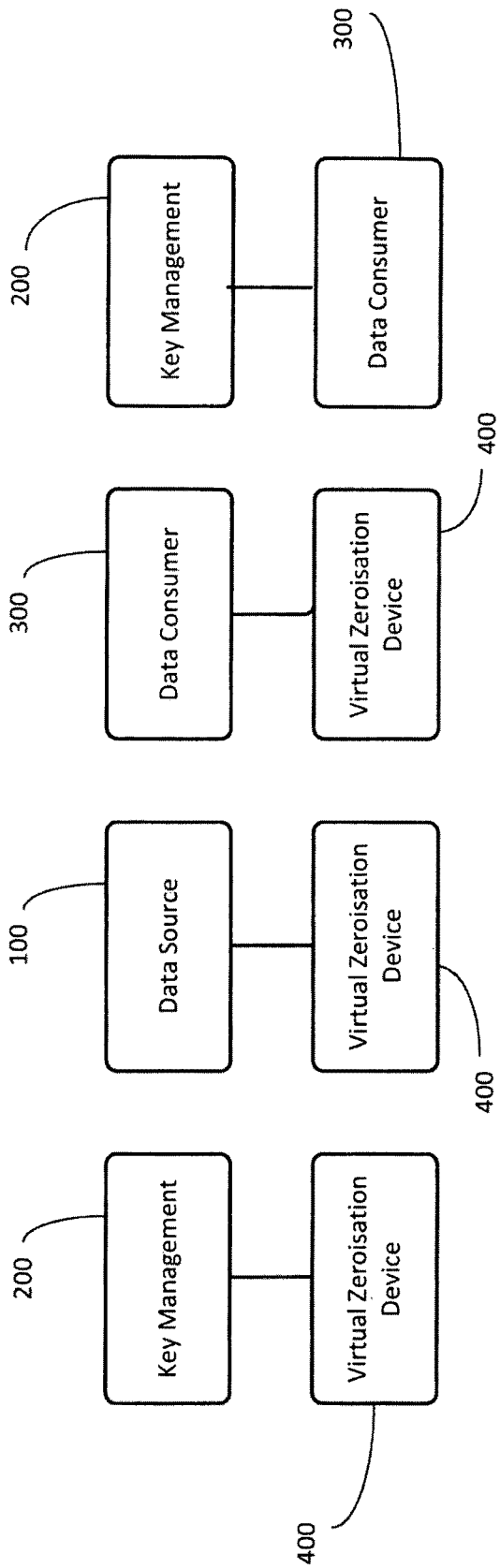
FIG. 3 illustrates operation of the virtual zeroisation device shown in FIG. 2.

FIG. 3 illustrates the method of operation of the virtual zeroisation device 400 for storage and recovery of collected data. In FIG. 3a, the virtual zeroisation storage device 400 is loaded with one-time key material from the key management system 200.

FIG. 3b illustrates that data collected by the data source 100 is written to the virtual zeroisation storage device 400. As the data is saved to the virtual zeroisation storage device 400, it is encrypted with the one-time pad key material. As the process of encryption continues, the key material used is erased from the virtual zeroisation storage device 400.

FIG. 3c illustrates that the data consumer 300 reads the collected data, as cipher text, from the virtual zeroisation storage device 400.

In FIG. 3d, the data consumer 300 uses the key material from the key management system 200, enabling the data consumer 300 to decrypt the cipher text and access the originally collected data.

Figure 4:
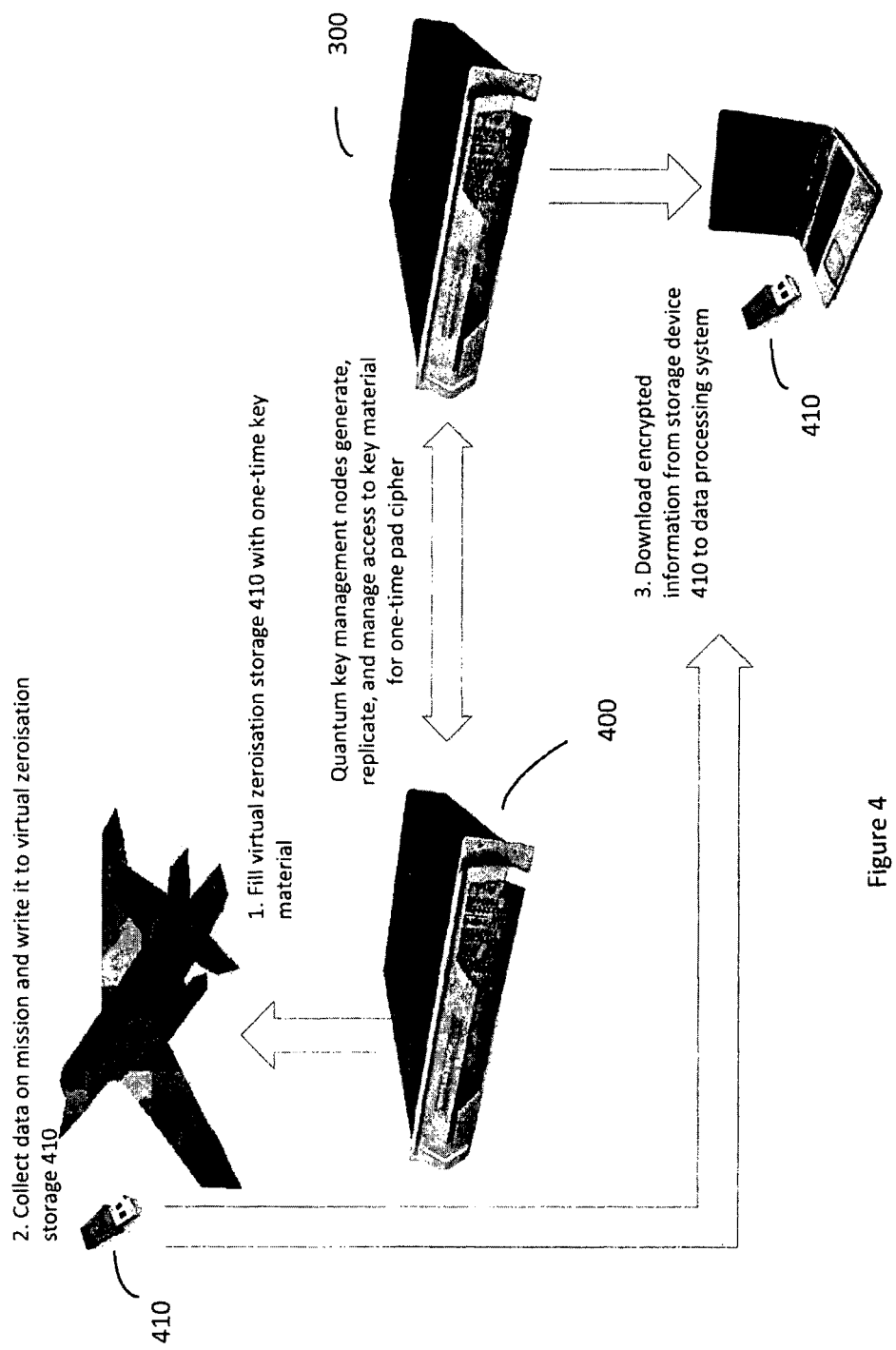
FIG. 4 illustrates use of the virtual zeroisation device in conjunction with the circumstance of FIG. 1.

FIG. 4 illustrates use of the virtual zeroisation device to protect data in the circumstances illustrated originally in FIG. 1. As described above, the virtual zeroisation storage device 410 is first filled with one-time pad key material using the control unit within the virtual zeroisation device 400. As the aircraft flight progresses, data is collected on the mission, and is written to the storage device 410. As this data is received, it is encrypted using the one-time pad material. Upon return of the mission (or transmission of the data by other means), the encrypted data in the storage device is decrypted by the data consumer 300, enabling appropriate analysis, e.g. by the data processing system.

If the mobile asset, i.e. storage device 410, is compromised during the mission, for example by coming under the control of an adversary, the adversary can try to read the collected data in its cipher text form. The data, however, is useless without the key material. Because the cipher text is protected by the information-theoretically secure one-time pad cipher, and because the key material used for the encryption cannot be recovered from the storage device, the collected data remains secure. The remaining unused key material which the adversary reads from the virtual zeroisation storage device 410 has not been used for any encryption, and therefore that key material is of no value to the adversary.

Among the advantages of the virtual zeroisation storage device over conventional storage devices, whether or not they used fixed length classical encryption, are that data saved on the storage device is encrypted using an information theoretic cipher—the one time pad, and that the key material used for the encryption operation cannot itself be recovered from the device. A third advantage is that because the used key material is not recoverable and because all data is stored in an encrypted form, manually initiated zeroisation of the device is not necessary. Furthermore, because any unused key material remaining on the device is of no value to an adversary; it is not necessary to equip the device with anti-tamper functionality.

FIG. 5 illustrates the method by which protection of the data on the storage device 410 is protected from an adversary. As shown in In FIG. 5a, the virtual zeroisation storage device 400 is loaded with one-time key material from the key management system 200.

In FIG. 5b, data collected by the data source 100 is written to the virtual zeroisation device 400. As plain text data is saved to the storage device within the virtual zeroisation device, it is encrypted with the one-time pad cipher. The key material used for encryption is erased from the storage device 410 as the cipher text data is stored in its place.

FIG. 5c assumes the adversary 500 has control of the virtual zeroisation device 400, and reads the collected data (as cipher text), and the unused key material from the virtual zeroisation storage device 410. Because the cipher text is protected by the information-theoretic secure one-time pad cipher, and because the key material used for the encryption cannot be recovered from the virtual zeroisation storage device 400, the collected data remains secure. The remaining unused key material read from the virtual zeroisation storage device 400 has not been used for encryption, and therefore provides no value to the attacker 500.

The preceding has been an explanation of a preferred embodiment of a virtual zeroisation device and method for protecting data in an information-theoretically secure manner. While a preferred embodiment of the system and method have been described, it will be understood that the scope invention is defined by the appended claims.

What is claimed is:

1. A security device comprising:
   a storage system; and
   a security system, the security system including:
   an external input/output interface configured to facilitate communications from (1) outside to inside of the security device and (2) inside to outside of the security device;
   an internal input/output interface coupled to the storage system and configured to facilitate communications between the security system and the storage system;
   an encryption subsystem (1) coupled to the external input/output interface and the internal input/output interface and (2) configured to produce encrypted data from unencrypted data using a one-time pad; and
   a bypass channel coupled to the external input/output interface and the internal input/output interface, wherein the bypass channel is configured to allow communications to bypass the encryption subsystem;
   wherein for storing the one-time pad, the security device is configured to:
   receive, by the security system, the one-time pad from a key management system via the external input/output interface; and
   store, by the security system, the one-time pad in the storage system from the external input/output interface via the internal input/output interface while bypassing the encryption subsystem via the bypass channel;
   wherein for encrypting the unencrypted data, the security device is configured to:
   receive, by the encryption subsystem, the one-time pad from the storage system via the internal input/output interface,
   receive, by the encryption subsystem, the unencrypted data from a data source via the external input/output interface when the security device is not in communication with the key management system,
   produce, by the encryption subsystem, the encrypted data by encrypting the unencrypted data using the one-time pad, and
   in response to the encryption subsystem producing the encrypted data, store, by the encryption subsystem, the encrypted data in the storage system, wherein storing the encrypted data in the storage system includes overwriting the one-time pad stored in the storage system with the encrypted data; and
   wherein for retrieving the encrypted data, the security device is configured to:
   receive a request for the encrypted data from a data consumer via the external input/output interface, and
   retrieve the encrypted data from the storage system via the internal input/output interface and sends the encrypted data to the data consumer via the external input/output interface while bypassing the encryption subsystem via the bypass channel.

2. The security device of claim 1, wherein:
   the one-time pad is also provided to the data consumer, and
   the encrypted data is decrypted, by the data consumer, using the one-time pad provided to the data consumer.

3. The security device of claim 1, wherein:
   the key management system is coupled to the security device during a first period for providing the one-time pad to the security device and the data source is not coupled to the security device during the first period; and
   the data source is coupled to the security device during a second period for providing the unencrypted data to the security device and the key management system is not coupled to the security device during the second period, the second period being different than the first period.

4. The security device of claim 1, wherein the storage system is filled with key material, and wherein the key material includes the one-time pad.

5. The security device of claim 1, wherein the one-time pad used to produce the encrypted data is a part of a one-time pad that fills the storage system.

6. The security device of claim 1, wherein the external input/output interface facilitates all communications from (1) inside to outside of the security device and (2) outside to inside of the security device.

7. The security device of claim 1, wherein the internal input/output interface facilitates all communications between the security system and the storage system.

8. The security device of claim 1, wherein the data source is a sensor, camera, or the storage system.

9. The security device of claim 1, wherein the storage system is solid state memory, flash memory, or a hard disk.

10. The security device of claim 1, wherein the unencrypted data is video information or military target information.

11. The security device of claim 1, wherein the one-time pad stored in the storage system is configured such that it is only able to be read once from the storage system.

12. The security device of claim 1, the one-time pad includes a series of random bits generated by a quantum generator.

13. The security device of claim 1, the request for the encrypted data is a direct read request addressed to the storage system, a network communication, or a file transfer from an intermediate device.

14. The security device of claim 1, wherein the one-time pad stored in the storage system is destroyed essentially contemporaneously with use of the one-time pad for encryption.

15. A method of securely protecting data, the method comprising:
   receiving, by a security system of a security device, a one-time pad from a key management system via an external input/output interface of the security system, wherein the external input/output interface is configured to facilitate communications from (1) outside to inside of the security device and (2) inside to outside of the security device;
   storing, by the security system, the one-time pad in a storage system of the security device from the external input/output interface via an internal input/output interface while bypassing an encryption subsystem via a bypass channel, wherein the internal input/output interface is coupled to the storage system and configured to facilitate communications between the security system and the storage system, wherein the bypass channel is coupled to the external input/output interface and the internal input/output interface, wherein the bypass channel is configured to allow communications to bypass the encryption subsystem, and wherein the encryption subsystem is (1) coupled to the external input/output interface and the internal input/output interface and (2) configured to produce encrypted data from unencrypted data using the one-time pad;

receiving, by the encryption subsystem, the one-time pad from the storage system via the internal input/output interface;

receiving, by the encryption subsystem, the unencrypted data from a data source via the external input/output interface when the security device is not in communication with the key management system;

producing, by the encryption subsystem, the encrypted data by encrypting the unencrypted data using the one-time pad;

in response to the encryption subsystem producing the encrypted data, storing, by the encryption subsystem, the encrypted data in the storage system, wherein storing the encrypted data in the storage system includes overwriting the one-time pad stored in the storage system with the encrypted data;

receiving a request for the encrypted data from a data consumer via the external input/output interface;

retrieving the encrypted data from the storage system via the internal input/output interface and sending the encrypted data to the data consumer via the external input/output interface while bypassing the encryption subsystem via the bypass channel.

16. The method of claim 15, wherein the storage system comprises a memory device.

17. The method of claim 15, wherein the one-time pad includes a series of random bits generated by a quantum generator.

\* \* \* \* \*